(12) United States Patent
Peto (10) Patent No.: US 9,318,970 B2
(45) Date of Patent: Apr. 19, 2016

(54) VOLTAGE REGULATION APPARATUS (76) Inventor: Raymond John Peto, Dorchester (GB)

(*) Notice: Subject to any disclaimer, the term of this patent is extended or adjusted under 35 U.S.C. 154(b) by 161 days.

(21) Appl. No.: 13/885,261

(22) PCT Filed: Nov. 15, 2011

(86) PCT No.: PCT/GB2011/001607
§ 371 (c)(1),
(2), (4) Date: May 24, 2013

(87) PCT Pub. No.: WO2012/066283
PCT Pub. Date: May 24, 2012

(65) Prior Publication Data
US 2013/0235634 A1 Sep. 12, 2013

(30) Foreign Application Priority Data

Nov. 15, 2010 (GB) .................................. 1019195.5

(51) Int. Cl.
H02M 7/06 (2006.01)
H02M 3/155 (2006.01)
H02M 5/293 (2006.01)

(52) U.S. Cl.
CPC ................ *H02M 7/06* (2013.01); *H02M 3/155* (2013.01); *H02M 5/293* (2013.01)

(58) Field of Classification Search
CPC ... H02M 3/156; H02M 3/158; H02M 3/1588; H02M 7/06; H02M 3/155; H02M 5/293

USPC .................................................. 323/282–288
See application file for complete search history.

(56) References Cited

U.S. PATENT DOCUMENTS 6,304,065 B1 * 10/2001 Wittenbreder ................. 323/225
2009/0230935 A1 * 9/2009 Yoshida ......................... 323/282

* cited by examiner

Primary Examiner — Jue Zhang
(74) Attorney, Agent, or Firm — William H. Bollman (57) ABSTRACT A voltage regulator for regulation both of AC and of DC voltages, is provided in a regulator module (30) which uses a repetitive switching signal (32) to control a switch (36) allowing current to be supplied to a reservoir capacitor (42) by supply from an unregulated rail (18). The module contains a dual inductor (44, 46, 48) having first (44) and second (46) identical windings and a common core. A current pass capacitor (43) is also provided. When the switch (36) is closed, the first winding (44) delivers current to the reservoir capacitor. When the switch (36) is open, both the second (44) and the first (46) windings deliver current to the reservoir capacitor (42). The apparatus can support balanced operation, where pairs of switches are operated alternately and oppositely. The switching signal (32) can be suitably voltage restored to provide a signal suitable to control and operates switches (36). Different configurations of transistor switches (36) and diodes (38) are shown.

7 Claims, 5 Drawing Sheets

VOLTAGE REGULATION APPARATUS

FIELD OF THE INVENTION

The present invention relates to an apparatus for regulating the output voltage of a DC or AC power supply. It particularly relates to applications involving AC power control. It is usefully employable for AC power control applications where, for example, it is required to control an AC motor.

BACKGROUND OF THE INVENTION

Power supply regulators, especially in switch mode power supplies, have their outputs regulated by means of a switch, an inductor with a winding, and a reservoir capacitor. The switch allows current to be delivered through the inductor to a reservoir capacitor. The switch is operated repetitively, usually in sympathy with switching in the switch mode power supply. The switch is controlled to be "on" or "off" for a proportion of the time that reflects the deviation experienced by the reservoir capacitor voltage from a target voltage.

The more current drawn from the reservoir capacitor, the greater the proportion of time the switch is closed. When no current is drawn, the switch is open for nearly the entire proportion of the cycle time. The target voltage may be fixed, as for a DC power supply, or may be varied, reflecting the instant AC target voltage for AC power supply situations.

Several problems exist with such a simple arrangement. In order to maintain a small ripple voltage, the current supplied to the reservoir capacitor by collapse of the magnetic field must never cease to flow. This is called continuous operation. In high current demand situations, if the switch operation frequency is too low, the magnetic field of the inductor can become discharged and the reservoir capacitor voltage can display a ripple component that is unacceptably large.

Even with continuous operation, the ripple on the reservoir capacitor can be undesirably large. The present invention further seeks to solve this problem by providing an apparatus operable to reduce ripple to a minimum level and ideally to reduce ripple virtually to zero.

Figures 3A, 3B:
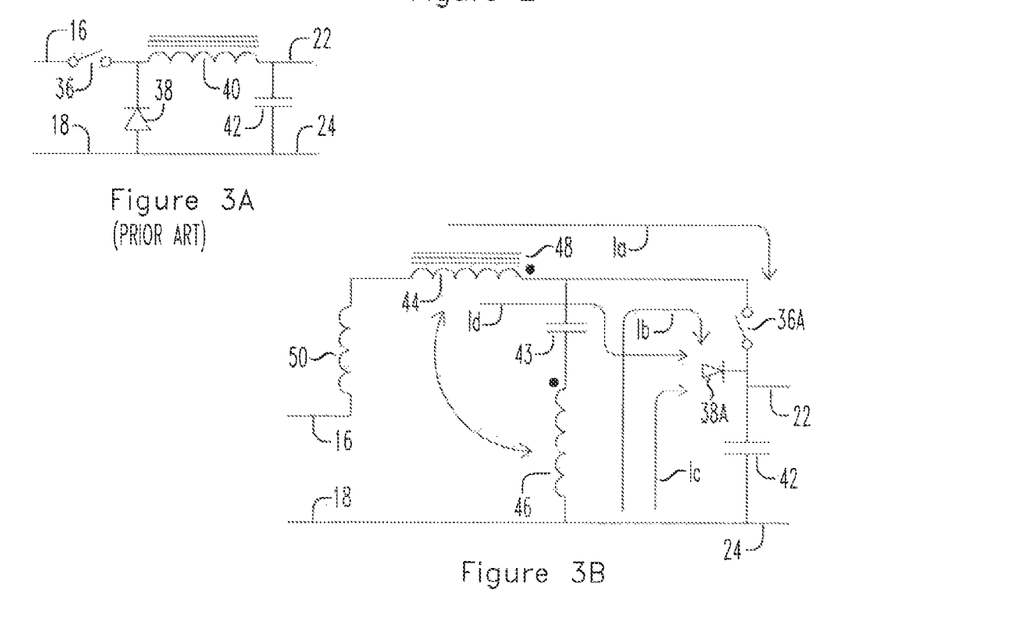
FIG. 3A is a circuit diagram showing a first prior art implementation of a regulator switching module.
FIG. 3B is a circuit diagram of a first example according to the invention.

A second problem is that the power drawn from the supply to the switching circuit also may have a large ripple current exacerbated by some switching topologies such as in FIG. 3A requiring no current flow into the input for a significant part of each cycle of operation. This means that the supply to the switching circuit itself may require extra filtering and storage components to smooth out these current variations.

The present invention seeks to provide an apparatus solving the aforementioned problems, and in particular, by lengthening the time over which current is delivered to the reservoir capacitor.

PRIOR ART

U.S. Pat. No. 4,546,304 (Braun) describes a constant voltage/constant current output circuit which is operable using fluctuating input voltages across a range of frequencies.

US Patent Application US2001/0017536 (Darzy) discloses a voltage converter circuit that includes a control arrangement that utilises a threshold detection which sense whether a voltage is above or below specific thresholds. Each of the current modes is ideally controlled by the same controller.

U.S. Pat. No. 6,704,211 (Intel Corporation) describes a DC-to-DC converter that includes a at least one capacitor and dual coil inductors employed to provide a different voltage and current for devices such as personal computer, whose current and voltage requirements change over a wide range.

Although the aforementioned systems disclose different examples of voltage regulators, none has addressed the specific problem of providing a voltage regulating apparatus adapted to increase the time interval over which current is delivered to a storage device.

SUMMARY OF THE INVENTION

According to a first aspect of the present invention, there is provided a voltage voltage regulator has an input rail and a common rail; a first inductor receives an input voltage and outputs a modified output signal to a current pass capacitor and a second inductor with first and second terminals, the first terminal of the second inductor shares a common connection with the current pass capacitor and a diode, the output of the diode has a common connection with a switch and a first terminal of a reservoir capacitor, a second terminal of the reservoir capacitor connects to the common rail, whereby in use, when the switch is closed (for a time period T1), current flows to the reservoir capacitor from the first inductor and from the second inductor via the current pass capacitor; and when the switch is opened (for a time period T2), current flows from the first inductor, via the current pass capacitor and via a diode, to the reservoir capacitor and from the second inductor via the diode; the switch is controlled by a switch control means which is operable to modulate the switch so as to provide an output voltage across the terminals of the output of the reservoir capacitor.

Thus it is appreciated that the magnitude of the output voltage is in dependence upon the product of $(T1/T2) \times V$ for a direct current (DC) input voltage (V).

A third inductor can be connected in series with the input rail so as to reduce current ripple on an input signal.

In a preferred embodiment the first and second inductors share a common core.

Advantageously the first and second inductors have identical number of windings.

According to a second aspect of the present invention, there is provided a voltage voltage regulating apparatus operable to regulate an unregulated power supply to attain a selected voltage, the unregulated power supply comprising first and second unregulated rails, where a switch is operable, when switched on, to provide current from the first unregulated rail to a reservoir capacitor and switch control means is operable repetitively to cause the switch to switch on for a proportion of time in dependence upon the deviation from the selected voltage of the regulated supply; a dual inductor having first and second identical windings on a common core, each winding having a first and a second end, both first ends producing the same polarity of voltage relative to the second ends, when the flux in the common core changes; where the first end of the first winding of the dual inductor is connected in series with the unregulated power supply, and the second end of the first winding of the dual inductor is connected in series with the switch, to deliver current to a first end of the reservoir capacitor through a current pass capacitor and a diode, the second end of the reservoir capacitor being connected with the second unregulated rail; the first end of the second winding of the dual inductor being connected to the second unregulated rail and the second end of the second winding is connected to the diode; such that in use, when the switch is closed, the first winding delivers current to the reservoir capacitor; and when the switch is opened, collapse of the magnetic field in the common core causes the second winding to deliver current to the reservoir capacitor via the diode and the first winding to deliver current to the reservoir capacitor through the current pass capacitor and the diode.

Preferably the invention further provides an apparatus which can comprising one or more auxiliary inductors, connected in series with the first winding, the second winding, or both, the total value of the inductance of the auxiliary inductor or inductors being a fractional part of the inductance of either of the first or second windings.

The invention also provides an apparatus wherein the switch can be controlled by a switching signal, wherein the switch can be a transistor switch, and wherein the switching signal can be voltage restored to voltage of the emitter of the transistor switch.

The invention, yet further, provides an apparatus wherein then apparatus can comprise a third winding on the common core, the third winding having the same number of turns as the first winding and as the second winding, and wherein the third winding can be provided to allow the transistor switch to have its emitter connected to a point not at a voltage swinging end of either the first or the second inductor.

The invention still further provides an apparatus which can comprise balanced transistor switches and balance diodes, the balanced transistor switches being alternately and oppositely switched sequentially "on" and "off" so as to enable synchronised rectification.

In this sense the balanced diodes and transistors act on an AC signal so as to streaming current in correct direction so as to deal with the polarity of the AC, whilst in a DC mode the efficiency of a synchronous rectification.

The invention even further provides an apparatus wherein a first switching group can comprise a first pair of transistor switches and a first pair of diodes and a second switching group can comprise a second pair of transistor switches and a second pair of diodes, the first and second switching groups being alternately and oppositely operated.

The invention yet further provides the switching function using switching devices and components that have a voltage rating no higher than either the input voltage to the voltage regulating apparatus or to the output voltage in the case of a topology that provides for an output voltage higher than the input voltage.

The invention is further explained, by way of an example, by the following description, to be read in conjunction with the appended drawings, in which:

DETAILED DESCRIPTION OF PREFERRED EMBODIMENTS

Figure 1:
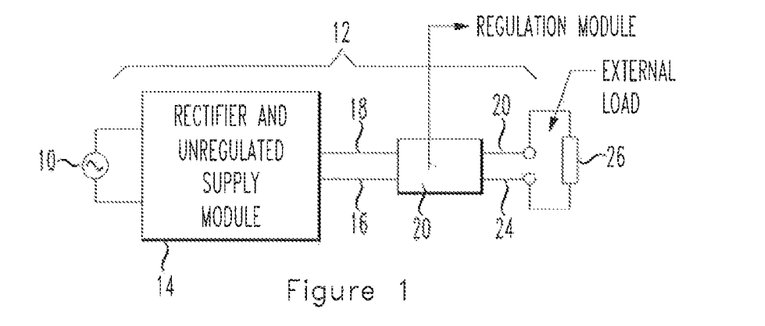
FIG. 1 is a schematic block diagram showing an environment wherein the present invention is applicable.

Attention is first drawn to FIG. 1.

FIG. 1 shows an AC power source 10 feeding a switch mode power supply 12 which comprises a rectifier and unregulated supply module 14 outputting a first unregulated rail 16 and a second unregulated rail 18. The rectifier and unregulated rail 18, which are provides as input to a regulation module 20. The regulation module 20 provides a first regulated rail 22 and a second regulated rail 24 which provide a selected fixed DC voltage to be applied to an external load 26.

Figure 2:
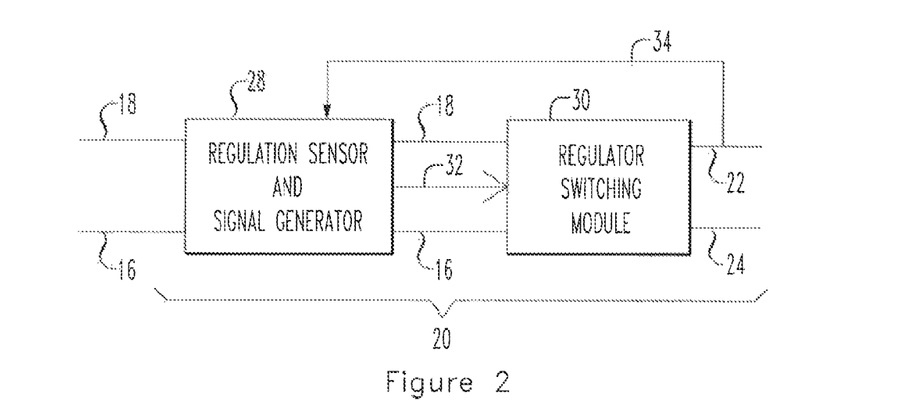
FIG. 2 shows a schematic block diagram of the regulation module otherwise shown in FIG. 1.

Attention is next drawn to FIG. 2.

FIG. 2 shows a schematic block diagram of the regulation module 20 otherwise shown in FIG. 1.

A regulation sensor and signal generator 28 receives the unregulated rails 16 18 and passes them to a regulator switching module 30 together with a pulse width modulated digital switching signal 32. A sensing line 34 provides the voltage on the regulated rails 22, 24 as a feedback signal to the sensor and signal generator 28 which creates switching signal 32 which is shorter in duration if the voltage at the regulated rails 22, 24 is less than a predetermined, selectable target voltage, and which is longer in duration if the voltage at the regulated rails 22, 24 is more than the predetermined target voltage, thereby operating to bring the voltage at the regulated rails 22 24 towards the selected target voltage.

The present invention concerns itself with improved configuration of the regulator switching module 30, thereby providing technical improvement over previous solutions.

Attention is next drawn to FIG. 3A, a circuit diagram showing a first prior art implementation of a regulator switching module 30.

The first unregulated rail 16 is provided in series with a switch 36 and the second unregulated rail 18 is provided at the overall ground for 18 24 for the regulator switch module 30. The switch 36 can be any switchable device including any of, but not limited to; junction transistors; field effect transistors, including MOSFETS and IGBTS, and Silicon Controller Rectifiers including Triacs.

The purpose of the switch 36 is to provide a controllable "on" state and a controllable "off" state in response to the switching signal 32 from the regulation sensor and signal generator 28. The switch 36 must also be capable of carrying sufficient current for provide output power into the load 26 (as shown in FIG. 1) from the first 22 and second 24 regulated lines at negligible voltage drop. It is to be understood that, where hereafter the switch is described as a transistor switch, the actual item can be any one of or any combination of, the items listed above.

In the description of FIG. 3A, and in the descriptions for all of the figures to follow except for FIG. 7, the first 16 and second 18 unregulated lines can be derived from any type of rough voltage module, which can be, but is not limited to, any one or more of: an AC mains rectified power source, an AC mains rectified and partially of fully smoothed power source; a switch mode power supply; a rectified radio frequency power source; and a battery source.

The first unregulated line 16 provides input to a first side of the switch 36 and the switch 36 provides output firstly to the cathode of a diode 38 whose anode is connected to the second unregulated line 18, and secondly to a first end of an inductor 40.

In this and all following descriptions, the direction of diode 38 conduction for the condition of the first unregulated line 16 having a more positive voltage than the second unregulated line 18. Were the second unregulated line 18 to have a more positive voltage that the first unregulated line 16, the direction of conduction of diode 38, and that of all polarity sensitive diodes, would be reversed and, in this example, its cathode would be connected to the second unregulated line 18 and its anode connected to output side of switch 36.

The second end of the inductor 40 is firstly connected as the first regulated rail 22 and secondly connected to a first end of a reservoir capacitor 42 whose second end is connected to the second unregulated line 18 which is also provided as the second regulated line 24.

The inductor 40 and the reservoir capacitor 42 have an inductance and a capacitance respectively which are consistent with the switching rate of the switch 36. If the switching rate is very high, a small inductance 40 and reservoir capacitor 42 will be sufficient in value and the inductor can be air cored, or provided on a dust iron or ferrite core. As the switching rate decreased, so the value of the inductor 40 and of the reservoir capacitor must be greater. This will become clear when the operation is explained hereafter.

The load 26, not shown in FIG. 3A, is connectable across the first 22 and second 24 regulated lines.

In use, when the switch 36 is switched "on", the positive voltage of the first unregulated line 16 biases the diode 38 not to conduct and the current to the load 26 and the reservoir capacitor 42 is carried through the inductor 40. When the switch 36 is in the "off" condition, the current through the inductor 40 continues to flow, the polarity of the inductor 40 collapsing magnetic field voltage becomes negative at the cathode of the diode 38, and the inductor 40 continues to provide current to the reservoir capacitor 42 and to the load 26 through the now conducting diode 38.

If the "off" time of the switch 36 is sufficiently long, the current delivered to the reservoir capacitor 42 eventually falls to zero, and the output voltage delivered to the load 26 begins to fall, causing output ripple. This is known as discontinuous current operation. If, however, the switch 36 is switched "on" again before the inductor 40 has completely discharged its magnetic field, supply of current to the reservoir capacitor never ceases. This is known as continuous current operation.

As earlier explained the regulation sensor and signal generator 28 controls the mark-space ratio of the switching signal 32 so that the output voltage is maintained at a target voltage no matter what current is taken by the load 26. If the load 26 current is high, the percentage of the time the switch 36 is "on" is correspondingly higher, and if the load 26 current on low, the percentage of the time the switch is "on" is correspondingly lower.

Attention is next drawn to FIG. 3B, a circuit diagram of a first example according to the invention. In FIG. 3B, like items from FIG. 3A are given like numbers and their description remains unaltered.

A feature of the example shown in FIG. 3B is a dual inductor comprising a first winding 44, a second winding 46, and a common core 48. The first and second windings 44 46 each have the same number of turns and are wound, either as separate windings or as a bifilar winding, on a common magnetic core 48. The second winding 46 can be, optionally, of a smaller current capacity wire, as it is not required to supply as much current as the first winding 44.

In the example shown, in addition to a storage capacitor 42, which can be any suitable large value, for example, 100 microfarads. There is also provided a current pass capacitor 43 which is of much smaller in value than the reservoir capacitor 42, for example, less than 10 microfarads. The purpose and function of the current pass capacitor 43 is made clear in the following explanation.

The first unregulated rail 16 is connected in series with an auxiliary inductor 50 which is connected to first end of the first dual winding 44. The second end of the first dual winding 44 is connected to a first end of the current pass capacitor 43 and to a first side of a first example switch 36A. The second end of the current pass capacitor 43 is connected to a first end of the second dual winding 46 whose other end is connected to the second unregulated rail 18 which is also the second regulated rail 24. The second end of the current pass capacitor 43 is also connected to the anode of a first example diode 38A whose cathode is connected to a second side of the first example switch 36A and to a first end of the first reservoir capacitor 42. The second end of the first reservoir capacitor 42 is connected to the second unregulated rail 18.

The auxiliary inductor 50 is situated in series with the first unregulated rail 16, between the first unregulated rail 16 and the first end of the dual winding 44. The value of the auxiliary inductor 50 is a fraction of the inductance value of either of the dual windings 44 46, preferably one tenth of their value. The auxiliary inductor 50 has the effect of further elimination ripple from the first unregulated regulated rail 16 and from the first regulated rail 22. The auxiliary inductance 50 can also be realised, in part or in whole by the main windings 44, 46 having a small amount of self inductance.

The advantage imparted by eliminating ripple from the first unregulated rail 16 involves the voltage sensing element of the effect of any ripple on the regulation sensor and signal generator 28 shown in FIG. 2. Any ripple on the first unregulated rail 16 can affect the reading of voltage difference which in turn alters the mark-space ratio of the switching signal 32. This can cause unwanted feedback effects.

The auxiliary inductor 50 can be a single inductor, or can be two or more smaller inductors provided in series with either end of the first 44 and second 46 windings. The sum of the inductances of plural auxiliary windings is a total inductance that would be used for a single auxiliary inductor 50. The single inductor 50 can be placed at either end of the first 44 and second 46 windings and advantage can be taken of placement of the coil in the winding with the lower current levels depending on the exact usage of the voltage regulation apparatus.

With the first example switch 36A closed, the current taken by the load 26 (not shown) and into the reservoir capacitor 42 is conducted by the first dual winding 44 and the auxiliary inductor 50. The voltage on the first regulated rail 22, also being the voltage on the first end of the reservoir capacitor 42, is equal to the output voltage from the first example switch 36A.

Referring to FIG. 3B, four currents Ia, Ib, Ic and Id are shown. When the first example switch 36A is closed, in operation, the current pass capacitor 43 bears a charge from the previous occasion that the first example switch 36A was closed, as will be explained. The current into the reservoir capacitor 42 and into the load 26 (not shown) is the sum of Ia and Ib If the current into the reservoir capacitor and the load, the total current, is designated by It, then:

$$It = Ia + Ib \text{(Switch 36A closed)}$$

When the switch 36A opens, the magnetic field in the common core 48 collapses, causing the end second end of the dual inductor first winding 44 to swing highly negative, the attempted voltage swing being absorbed by the current pass capacitor 43 and sent through the first example diode 38A as a current from the dual inductor first winding 44 to contribute to the total output current It. At the same time, the collapse in the magnetic field of the common core 48 causes the second end of the second dual winding 46 also to become highly positive, the current from the second dual winding 46 being sent through the first example diode 38A also to contribute to the total current It.

$$It = Ic + Id \text{(switch 36A open)}$$

The first unregulated rail 16 current is Ia (switch 36A closed) and Ic (switch 36A open). The mean power supplied to the first unregulated rail 16 is the same (allowing for slight losses) as the power provided as output at the first regulated rail 22.

The auxiliary inductor 50 has the beneficial technical improvement of further eliminating whatever is the residual regulator ripple found, in the absence of the auxiliary inductor 50, at the first regulated rail 22 and the first unregulated rail 16.

Figure 4A:
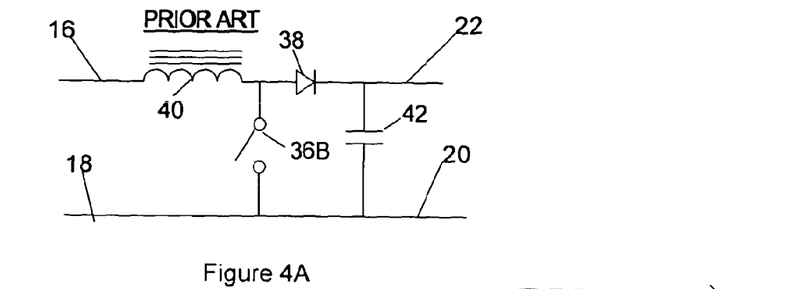
FIG. 4A is a circuit diagram of second prior art circuit over which the present invention provides improvement.

Attention is next drawn to FIG. 4A, a circuit diagram of second prior art circuit over which the present invention provides improvement. Like items from FIG. 3A are similarly designated, and no further explanation is given. In FIG. 4A, the switch 36B, instead of being in series with the inductor 40, as in FIG. 3A, is coupled between the second end of the inductor and the second unregulated rail 18. The diode 38, instead of being coupled to the first end of the inductor 40 and the second unregulated rail 18, as in FIG. 3A, is coupled in series with the reservoir capacitor 42.

Figure 4B:
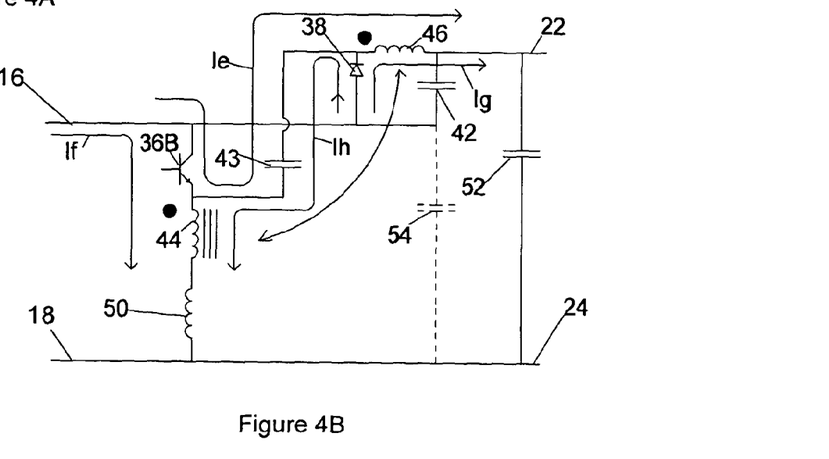
FIG. 4B is a circuit diagram showing a second example of the invention, improving over the prior art circuit of FIG. 4A.

Attention is next drawn to FIG. 4B, a circuit diagram showing the second example of the invention, improving over the prior art circuit of FIG. 4A.

In FIG. 4B, like items from FIG. 3A are similarly designated, and like numbers denote like items. The second example switch 36B is shown, by way of an example, as a switching transistor.

In FIG. 4B fifth to eighth currents Ig and Ih are indicated. Operation is exactly the same as for the first example of FIG. 3B, with the exception that the regulating circuit is stood (voltage wise) atop the first unregulated rail. This has the effect over the first example of FIG. 3B, of allowing voltages greater than the voltage on the first unregulated rail 16. Note that because of the conduction direction of diode 38 the output voltage cannot be less than the input voltage.

The current on the first unregulated rail 16 (frail) is given by $$Irail = Ie + If \text{(switch 36B closed)}$$

$$Irail = Ih + Ig \text{(switch 36B open)}$$

An overall smoothing capacitor 52 is preferably added between the first 22 and second 24 regulated lines, and/or a secondary smoothing capacitor 54 (shown in broken outline) fitted between the first 16 and second 18 unregulated rails.

Figure 4C:
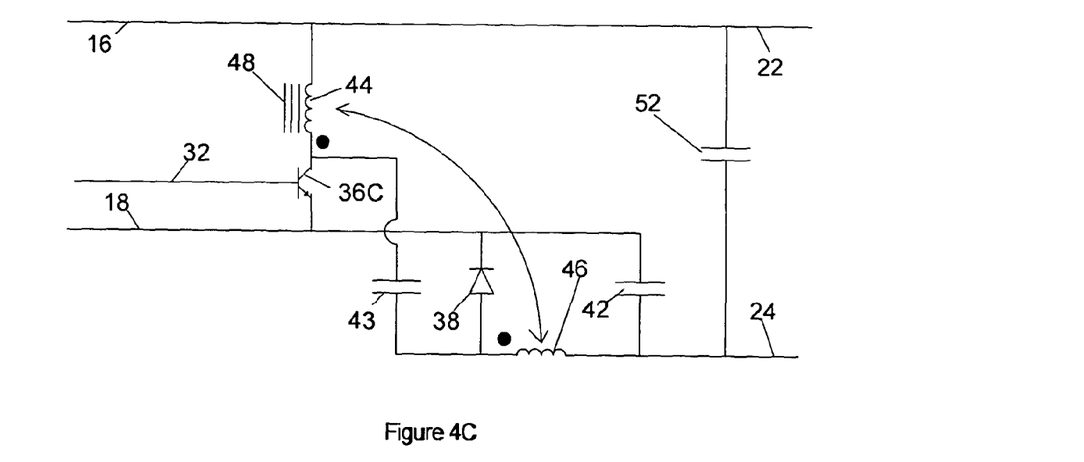
FIG. 4C is a circuit diagram showing an improvement upon the example of FIG. 4B.

Attention is next drawn to FIG. 4C, showing an improvement upon the example of FIG. 4B.

In FIG. 4C, like items from FIG. 4B are similarly designated. In FIG. 4C, the regulated output is provided beneath the second unregulated rail. The switching signal 32 now operates between the second unregulated rail 18 and the base of the switching transistor switch 36C, making driving of the switch considerably easier that in any of the preceding example, where the emitter would be sitting at the potential of winding 44.

In another option, not shown, regulated circuits can be provided both atop the first unregulated rail 16 as shown in FIG. 4B and the beneath second unregulated rail 18, as shown in FIG. 4C, allowing regulated provision of up to twice the voltage supplied to the first 16 and second 18 unregulated rails.

In another option, not shown, regulated circuits can be provided as a combination of both 3B and 4B to provide an output voltage from zero to above the input voltage while still using parts with minimum voltage and power rating and also with an output polarity the same as the input.

Figure 5A:
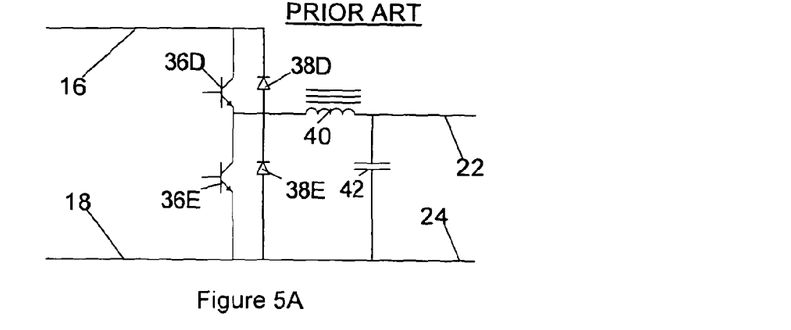
FIG. 5A is a circuit diagram showing another prior art circuit over which the present invention seeks to provide improvement.

Attention is next drawn to FIG. 5A, another prior art circuit over which the present invention seeks to provide improvement. Balanced switches 36D 36E are alternately switched on and off, and balance diodes 38D 38E conduct on alternate episodes of the switching cycle. The duty cycle of the on and off periods of each balanced switch 36D 36E is determined by the regulation sensor and signal generator 28 of FIG. 2. In FIG. 5A, like items from previous figures are similarly designated.

Figure 5B:
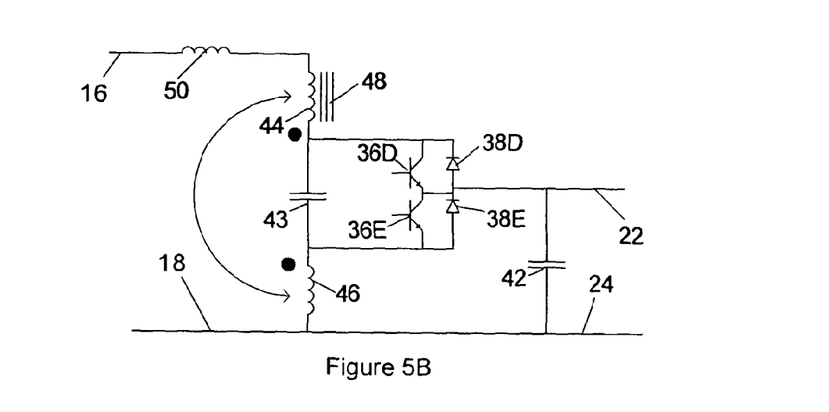
FIG. 5B is a circuit diagram showing an example of the invention which improves over the prior art example of FIG. 5A.

Attention is next drawn to FIG. 5B, showing an example of the invention which improves over the prior art example of FIG. 5A.

Like items from FIG. 5A are similarly designated, as are like items from all earlier figures.

The example shown in FIG. 5B provides balanced operation with improved smoothing over the example shown in FIG. 5A, exploiting the same principle shown and described in relation to FIGS. 3B 4B 5B and 5C.

A problem exists with the FIG. 5B example. The switching transistor 36E sits atop the widely fluctuating voltage found at the end of the dual inductor second winding 46, making the switching transistor 36E extremely hard to be switched on or off when driven by the switching signal 32 shown in FIG. 2. The dual windings 44 46 provide voltage edges which have a very fast rate of change, making it difficult to block the fast voltage edges by use of capacitors to differentiate the switching signal 32 from the fast voltage edges.

Figure 5C:
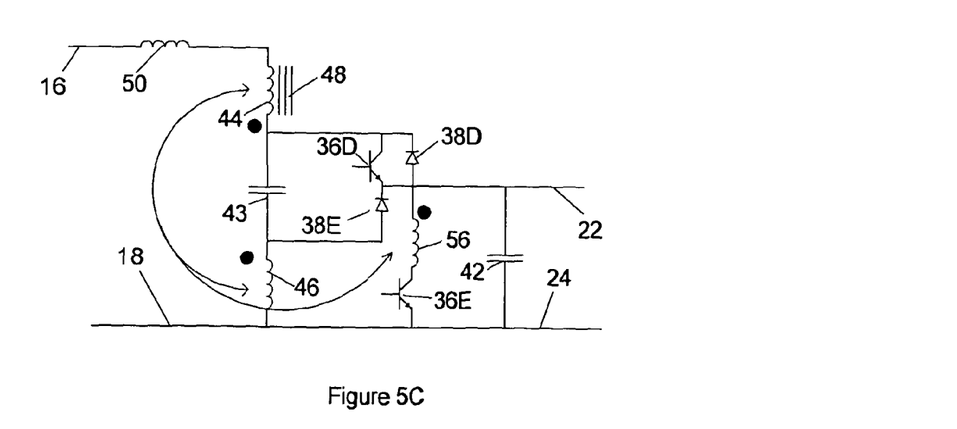
FIG. 5C is a circuit diagram showing a further improvement over the example shown in FIG. 5B.

Attention is next drawn to FIG. 5C, showing a further improvement over the example shown in FIG. 5B.

In FIG. 5C, an inductor third winding 56 is provided, on the same common core 48 as the first 44 and second 46 windings and having the same number of turns as the first 44 and second 46 windings. The third winding 56 is coupled between the collector of the switching transistor 36E and the first regulated rail 22. The emitter of the switching transistor 36 E is connected to the second regulated rail 24. The polarity of the third winding 56 is the same as the polarity of the second winding 46.

The circuit in the example of FIG. 5C operates in the same manner as the example of FIG. 5B, and has the improvement that the emitter of the switching transistor 36E is at the potential of the second unregulated rail 18 and the potential of the emitter of the switching transistor 36D is at the potential of the first regulated rail 22, thus making both switching transistors 36D 36E much easier to be driven by a signal to their bases provided by the switching signal 32 shown in FIG. 2.

Figure 6:
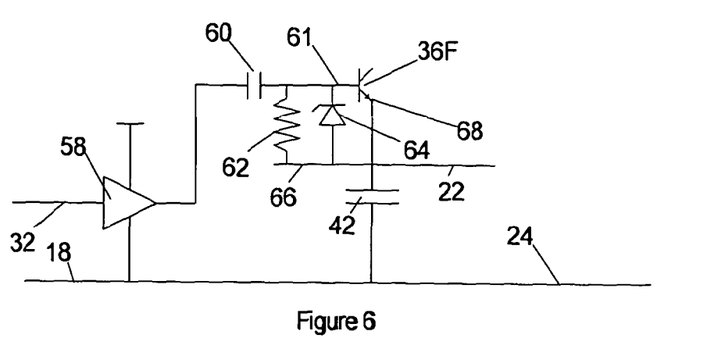
FIG. 6 is a circuit diagram showing how the switching signal can, generically, be transposed in voltage level to switch a generic switching transistor.

Attention is next drawn to FIG. 6, a circuit diagram showing how the switching signal 32 can, generically, be transposed in voltage level to switch a generic switching transistor 36F.

The generic switching transistor 36F can be any switching transistor 36 from any example of the invention. The switching signal 32 is provided as input to buffer amplifier 58, powered, for example, by a twelve volt rail. The output signal from the buffer amplifier 58 is coupled to a switch signal coupling capacitor 60 driving the base 61 of the generic switching transistor 36F. The base 61 of the generic switching transistor 36F is coupled by a parallel loading resistor 62 and a Zener diode 64 to a common local ground 66 coupled to the emitter 68 of the generic switching transistor 36F. By this arrangement, the DC level of the switching signal 32 is restored to that of the common local ground 60 and the generic switching transistor 36F receives an acceptable signal to switch in sympathy with the switching signal 32. In the example shown, the emitter 68 of the generic switching transistor 36F is coupled to the first regulated rail 22 and the reservoir capacitor 42.

The switching signal 32 provides pulse width varied digital signal ranging in width from 0% to 100%. For a switching signal repetition rate of 25 KHz, the switch signal coupling capacitor 60 can have a value of 60 nF (nanofarads) and the loading resistor a value of 5 k Ohms. The Zener diode 64 can have any value consistent with switching the generic switching transistor 36F on and off and similar to the voltage output from the buffer amplifier 58.

The local ground 66 is connected to the emitter 68 of whatever switching transistor 36F in whatever configuration of the invention the arrangement of FIG. 6 is employed.

Figure 7A:
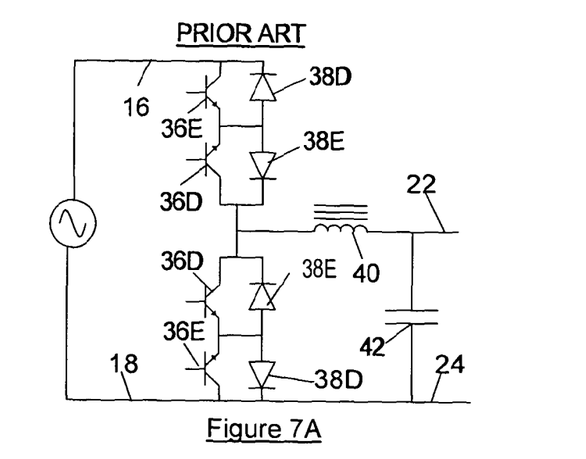
FIGS. 7A, and 7B, show prior art AC configurations used to control and regulate AC voltage.
Figure 7B:
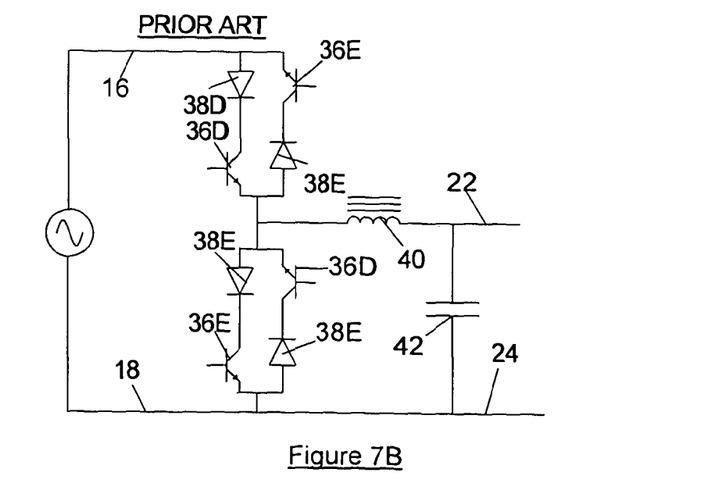
Figure 7C:
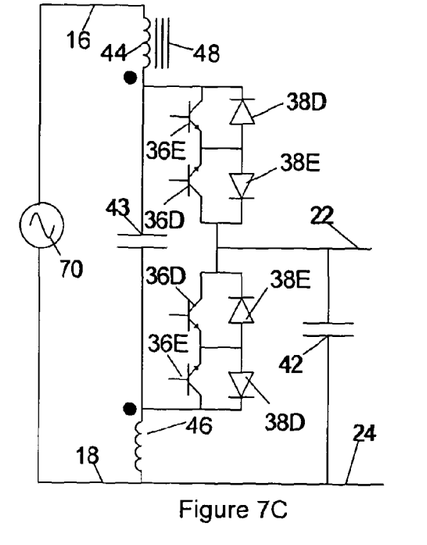
FIGS. 7C, 7D and 7E illustrate possible alternative connection configurations employing the present invention for balanced diodes and balanced switches used for direct switching of AC power based, in this example, the circuit of FIG. 5B.
Figure 7D:
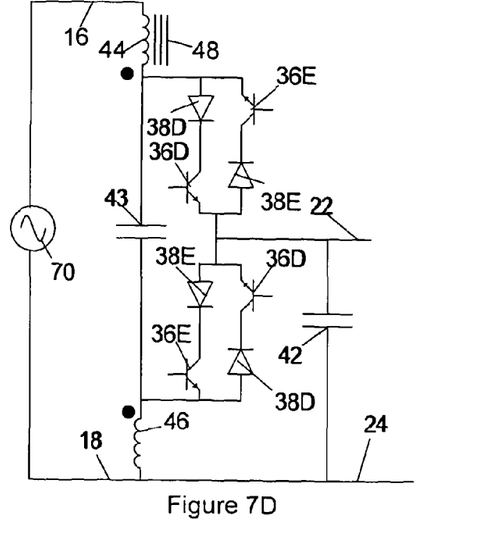
Figure 7E:
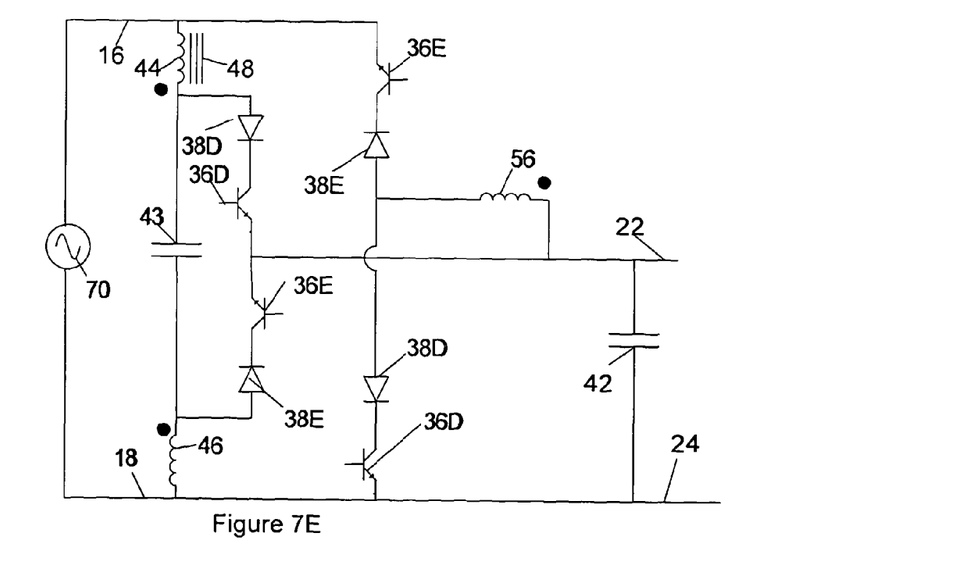

Attention is next drawn to FIGS. 7A, 7B, which show prior art regulation solutions for use where the voltage supplied to the unregulated rails 16 18 is an AC voltage, and to FIGS. 7C, 7D and 7E illustrating possible connections for the direct control of AC voltage levels. FIGS. 7A and 7B relate to FIG. 3A, illustrating the same generic prior art solution for DC voltage level control.

FIGS. 7A and 7B show prior art circuits for voltage control of AC voltages, over which the present invention seeks to provide improvement. The first 16 and second 18 unregulated rails are connected to an AC power source 70. The combinations of balanced switches 36D 36E and balanced diodes 3D 38E provide two possible configurations allowing current to flow in both directions. The combinations are arranged, in each prior art example, in two switching groups, in each example the two groups being alternately and oppositely switched.

Attention is next drawn to FIGS. 7C and 7D, showing an example of the invention which improves over the prior art example of FIGS. 7A and 7B.

FIGS. 7C and 7D shows an apparatus wherein a first switching group can comprise a first pair of transistor switches and a first pair of diodes, and a second switching group can comprise a second pair of transistor switches and a second pair of diodes, the first and second switching groups being alternately and oppositely operated while within the electromagnetic network of windings 44 and 46, and the capacitor 43. Because of the nature of the switching pairs, for example 36D, 36E, 38D and 38E, current can flow in and out of the input and output in all 4 quadrants. The addition of the coil 50 in one of the windings minimises the input and output current ripples.

The connection configurations are for balanced diodes 38D 38E and balanced switches 36D 36E based, in this example, upon the circuit of FIG. 5B. Like items in FIG. 5B are given the same designations in FIGS. 7A, 7B, 7C, 7D and 7E. The 7E configuration may be operated by the application of the circuit of FIG. 6.

In FIG. 7C four, balanced switches 36D 36E and provided in two bridge circuit with their respective four balanced diodes 38E 38D, the centre of the bridge being short circuited for the balance switches to conduct current through their respective balanced diodes 38D 38E.

In FIG. 7D two sets of balanced switches in each part of a combined pair of circuits are provided in series with their respective balanced diodes 38D 38E.

Attention is next drawn to FIG. 7E, showing an example of the invention which provides for better accessibility of the transistors 36E in the example of FIG. 7D, brought about by the use of a third winding 56 on the common core 48.

It is appreciated that variation may be made to the embodiments described without departing from the scope of the invention which is further defined by the following Claims.

The invention claimed is:

1. A voltage regulator comprising:
an input rail (16) and a common rail (18);
a first inductor (44) to receive an input voltage from said input rail, and to output a modified output signal to a current pass capacitor (43) and a second inductor (46) with first and second terminals;
a first terminal of the second inductor (46) sharing a common connection with the current pass capacitor (43) and a diode (38E), the output of the diode (38E) having a common connection with a switch (36D) and a first terminal of a reservoir capacitor (42),
a second terminal of the reservoir capacitor (42) connecting to the common rail (18, 24),
whereby in use, when the switch (36D) is closed (for a time period T1), current flows to the reservoir capacitor (42) from the first inductor (44) and current flows from the second inductor (46), via the current pass capacitor (43);
and when the switch (36D) is opened (for a time period T2), current flows from the first inductor (44), via the current pass capacitor (43) and via diode (38E), to the reservoir capacitor (42) and current flows from the second inductor (46) via the diode (38E) to the reservoir capacitor;
wherein the switches (36D and 36E) are controlled by a switching signal (32) so as to provide an output voltage across the terminals (22, 24) of the reservoir capacitor (42); and
wherein the switches (36D and 36E) provide a controllable "on" state and a controllable "off" state in response to the switching signal (32) from a regulation sensor and a signal generator (28) whereby, during time periods T1 and T2 switching of switches (36D and 36E) and switching of diodes (38D and 38E) to conduct, controls the current in first and second inductors (44, 46) so as to provide a controllable output voltage across the terminals (22, 24) of the output of the reservoir capacitor (42), thereby limiting voltage swings across the first and second inductors by connecting capacitor (42) to the switches (36D, 36E) and diodes (38D, 38E).

2. A voltage regulator according to claim 1, wherein:
a magnitude of the output voltage is in dependence upon the product of (T1/T2)×V for a direct current (DC) input voltage (V).

3. A voltage regulator according to claim 1, wherein:
the first inductor (44) and the second inductor (46) share a common core (48).

4. A voltage regulator according to claim 1, wherein:
the first inductor (44) and the second inductor (46) have identical number of windings.

5. A voltage regulator according to claim 1, further comprising:
   a third inductor (56) connected in series with the input rail (16) so as to reduce current ripple.

6. The voltage regulator according to claim 5, further comprising:
   at least one auxiliary inductor (50), connected in series with the first inductor (44), the second inductor (46), or both the first inductor (44) and the second inductor (46);
   wherein an inductance of the at least one auxiliary inductor (50) is a fraction of an inductance of either the first inductor (44) or the second inductor (46).

7. The voltage regulator according to claim 5, wherein:
   the third inductor (50) has a same number of turns as the first inductor (44) and the second inductor (46) so as to allow transistor switch (36E) to have its emitter connected to either the first inductor (44) or the second inductor (46).

\* \* \* \* \*